US010056990B2

(12) United States Patent
Takahashi et al.

(10) Patent No.: US 10,056,990 B2
(45) Date of Patent: Aug. 21, 2018

(54) BASE STATION ANTENNA APPARATUS FOR MOBILE COMMUNICATION SYSTEM

(71) Applicants: DENKI KOGYO COMPANY, LIMITED, Tokyo (JP); KDDI CORPORATION, Tokyo (JP)

(72) Inventors: Yukitaka Takahashi, Tokyo (JP); Keisuke Sato, Tokyo (JP); Masayuki Nakano, Saitama (JP)

(73) Assignees: DENKI KOGYO COMPANY, LIMITED (JP); KDDI Corporation (JP)

( * ) Notice: Subject to any disclaimer, the term of this patent is extended or adjusted under 35 U.S.C. 154(b) by 0 days.

(21) Appl. No.: 15/502,672

(22) PCT Filed: Aug. 12, 2014

(86) PCT No.: PCT/JP2014/071264
§ 371 (c)(1),
(2) Date: Jul. 6, 2017

(87) PCT Pub. No.: WO2016/024326
PCT Pub. Date: Feb. 18, 2016

(65) Prior Publication Data
US 2017/0346576 A1 Nov. 30, 2017

(51) Int. Cl.
*H04M 1/00* (2006.01)
*H04B 17/17* (2015.01)
(Continued)

(52) U.S. Cl.
CPC ............. *H04B 17/17* (2015.01); *H01Q 1/246* (2013.01); *H01Q 3/28* (2013.01); *H01Q 3/34* (2013.01);
(Continued)

(58) Field of Classification Search
None
See application file for complete search history.

(56) References Cited

U.S. PATENT DOCUMENTS

2009/0015473 A1     1/2009   Tomita et al.
2011/0243040 A1*   10/2011   Khan .................. H04B 7/0617
                                                                        370/280
(Continued)

FOREIGN PATENT DOCUMENTS

GB           2467773 A      8/2010
JP      H11251821 A      9/1999
(Continued)

OTHER PUBLICATIONS

Supplementary European Search Report in EP 14899578, dated Mar. 8, 2018, 3 pages.
(Continued)

*Primary Examiner* — Mohammed Rachedine
(74) *Attorney, Agent, or Firm* — Lerner, David, Littenberg, Krumholz & Mentlik, LLP

(57) ABSTRACT

The apparatus automatically corrects deformation of directivity in a vertical plane caused by abnormality in transmission paths and receiving paths. The apparatus includes transmission system detection means (13-1 to 13-4) configured to individually detect abnormality occurring in each of the transmission paths, receiving system detection means (23-1 to 23-4) configured to individually detect abnormality occurring in each of the receiving paths, and control means (30, 40) configured, if any abnormal transmission path has been detected by the transmission system detection means (13-1 to 13-4), to correct deformation of directivity of the transmission antenna in a vertical plane caused due to abnormality in the transmission path by changing and setting a phase and an amplitude of the transmission signal passing through a normal transmission path, and if any abnormal
(Continued)

receiving path has been detected by the receiving system detection means (23-1 to 23-4), to correct deformation of directivity of the receiving antenna in a vertical plane caused due to abnormality in the receiving path by changing and setting a phase and an amplitude of the receiving signal passing through a normal receiving path.

11 Claims, 9 Drawing Sheets

(51) Int. Cl.
    *H01Q 1/24*     (2006.01)
    *H01Q 3/34*     (2006.01)
    *H01Q 3/28*     (2006.01)
    *H04B 17/12*     (2015.01)
    *H04B 17/14*     (2015.01)
    *H04W 88/08*     (2009.01)

(52) U.S. Cl.
    CPC ............. *H04B 17/12* (2015.01); *H04B 17/14* (2015.01); *H04W 88/08* (2013.01)

(56) References Cited

U.S. PATENT DOCUMENTS

2012/0064838 A1* 3/2012 Miao ................. H01Q 3/267
                                                        455/73

2013/0088954 A1     4/2013   Sakamoto et al.
2013/0183907 A1     7/2013   Kim et al.
2016/0308597 A1*   10/2016   Kim ..................... H04B 7/0617

FOREIGN PATENT DOCUMENTS

| JP | 2000032529 | | 1/2000 |
|---|---|---|---|
| JP | 2001211025 | | 8/2001 |
| JP | 3573269 | B2 | 10/2004 |
| JP | 2005210364 | A | 8/2005 |
| JP | 2005236884 | A | 9/2005 |
| JP | 2008118428 | A | 5/2008 |
| JP | 4133876 | B2 | 8/2008 |
| JP | 2008211482 | | 9/2008 |
| JP | 2008312197 | | 12/2008 |
| JP | 4384892 | B2 | 12/2009 |
| JP | 4447337 | B2 | 4/2010 |
| JP | 2010124194 | A | 6/2010 |
| JP | 2010200166 | A | 9/2010 |
| JP | 2013085084 | | 5/2013 |

OTHER PUBLICATIONS

International Search Report for Application No. PCT/JP2014/071264 dated Nov. 18, 2014.
Notification of Reasons for Refusal in Japanese Application No. 2013-033592 dated Apr. 26, 2018.

\* cited by examiner

BASE STATION ANTENNA APPARATUS FOR MOBILE COMMUNICATION SYSTEM

CROSS-REFERENCE TO RELATED APPLICATION

This application is a national phase entry under 35 U.S.C. § 371 of International Application No. PCT/JP2014/071264, filed on Aug. 12, 2014, published in Japanese, the disclosure of which is incorporated herein by reference.

FIELD OF THE INVENTION

The present invention relates to a base station antenna apparatus for a mobile communication system, and more specifically, relates to a technique for correcting deformation of the directivity in a vertical plane that may occur due to abnormality in a transmission path and a receiving path.

BACKGROUND ART

In a base station antenna apparatus for a mobile communication system, it is necessary to adjust the directivity in a vertical plane to form an appropriate communication area. Accordingly, for example, in an array antenna according to Patent Literature 1, the beam tilt angle is changed by adjusting a phase shifting device that is arranged in a feed circuit.

On the other hand, in Patent Literature 2, for example, an adaptive array antenna apparatus is disclosed, which includes a configuration in which phase and amplitude changing means, which is means for changing a phase and an amplitude of a signal of a radio signal frequency in a digital or an analog manner, is arranged for each antenna, and the phase shift quantity of the phase shifting device is controlled so that the directivity adapted to an estimated incoming direction of a specific radio signal frequency is implemented.

CITATION LIST

Patent Literature

[Patent Literature 1] JP 2001-211025 A
[Patent Literature 2] JP 2008-312197 A

SUMMARY OF INVENTION

Technical Problem

In a conventional antenna apparatus as described above, the directivity may be disturbed if an abnormality such as failure in the phase shifting device or broken coaxial cables has occurred in some of paths to which each antenna is connected. However, this conventional antenna apparatus is not capable of immediately responding to cases of abnormality described above, and thus, in such cases, an appropriate communication area cannot be secured, which may result in degradation of the service quality.

Under these circumstances, an object of the present invention is to provide a base station antenna apparatus for a mobile communication system that is capable of automatically correcting deformed directivity in a vertical plane occurring due to abnormality in the transmission paths and the receiving paths to a directivity that is similar to a directivity in the vertical plane in a normal state.

Solution to Problem

According to the present invention, a base station antenna apparatus for a mobile communication system is configured to feed a high frequency power signal of a radio signal frequency to transmission antennas connected respectively to two or more transmission paths via the transmission paths and to synthesize reception signals received by receiving antennas respectively connected to two or more receiving paths via the receiving paths, in which both the transmission antennas and the receiving antennas are respectively arranged in a vertical direction with a predetermined distance, and in order to achieve the above-described object, the apparatus includes transmission system detection means configured to individually detect abnormality occurring in each of the transmission paths, receiving system detection means configured to individually detect abnormality occurring in each of the receiving paths, and control means configured, if any abnormal transmission path has been detected by the transmission system detection means, to correct deformation of directivity of transmission antenna in a vertical plane caused due to abnormality in the transmission path by changing and setting a phase and an amplitude of a transmission signal in a normal transmission path, and, if any abnormal receiving path has been detected by the receiving system detection means, to correct deformation of directivity of receiving antenna in a vertical plane caused due to abnormality in the receiving path by changing and setting a phase and an amplitude of a reception signal in a normal receiving path.

According to the base station antenna apparatus for a mobile communication system as an aspect of the present invention, the control means is configured to perform setting for changing the phase and the amplitude of the transmission signal in a normal transmission path and setting for changing the phase and the amplitude of the reception signal in a normal receiving path based on data in a data table previously stored in storage means.

According to another aspect of the present invention, in the base station antenna apparatus for a mobile communication system, the transmission system detection means for individually detecting abnormality occurring in each of the transmission paths is configured to compare a level of the transmission signal passing through each of the transmission paths with a reference value, and the receiving system detection means for individually detecting abnormality occurring in each of the receiving paths is configured to compare a level of the reception signal passing through each of the receiving paths with a reference value.

According to yet another aspect of the present invention, in the base station antenna apparatus for a mobile communication system, the control means includes transmission system phase and amplitude setting means separately provided for each of the transmission paths, which is configured to set both the phase and the amplitude of the transmission signal passing through each of the transmission paths, and receiving system phase and amplitude setting means separately provided for each of the receiving paths, which is configured to set both the phase and the amplitude of the receiving signal passing through each of the receiving paths, and in the apparatus, the phase and the amplitude of the transmission signal in the normal transmission path are changed and set by using the transmission system phase and amplitude setting means provided for the normal transmission path of the transmission paths, and the phase and the amplitude of the receiving signal in the normal receiving path are changed and set by using the receiving system phase and amplitude setting means provided for the normal receiving path of the receiving paths.

An amplification device may be arranged for each of, and at a stage subsequent to, the separately provided transmission system phase and amplitude setting means, and an amplification device may be arranged for each of, and at a stage before, the separately provided receiving system phase and amplitude setting means.

According to yet another aspect of the present invention, a transmission and reception shared antenna used in a shared manner for a radio signal frequency for transmission and a radio signal frequency for receiving is used as each of the transmission antennas and each of the receiving antennas, and the transmission and reception shared antenna is connected to the corresponding transmission path and the corresponding receiving path via a distribution and synthesis device.

Further, the apparatus may include a plurality of transmission and reception shared antenna connected via the distribution and synthesis device.

According to yet another aspect of the present invention, the apparatus may further include means configured, if any said abnormal transmission path has been detected, to disconnect the transmission antenna connected to the abnormal transmission path from the transmission path and terminate the path to a characteristic impedance of the path, and means configured, if any said abnormal receiving path has been detected, to disconnect the receiving antenna connected to the abnormal receiving path from the receiving path and terminate the path to a characteristic impedance of the path.

According to yet another aspect of the present invention, both the distance of arrangement of the transmission antennas and the distance of arrangement of the receiving antennas are set to satisfy the following condition:

$$0.5\lambda \leq d \leq 1\lambda$$

where $\lambda$ is a wavelength of a center frequency of an operating frequency band.

Note that the control means is configured, if the transmission path in which abnormality has occurred has returned to a normal state, to perform processing for restoring a directivity of the transmission antenna in a vertical plane to a normal directivity, and if the receiving path in which abnormality has occurred has returned to a normal state, to perform processing for restoring a directivity of the receiving antenna in a vertical plane to a normal directivity.

Advantageous Effects of Invention

According to the present invention, if abnormality in one or more transmission paths and receiving paths has occurred, the directivity in vertical plane can be automatically corrected to a directivity approximated to a directivity in a vertical plane in a normal state, and thus, variation in the communication area can be suppressed to a minimum and degradation of service can be prevented. In addition, because the directivity is corrected by changing the phase and the amplitude of a signal of radio signal frequency, no circuit for demodulating the signal of radio signal frequency to a signal in the base band is necessary.

DESCRIPTION OF EMBODIMENTS

Figure 1:
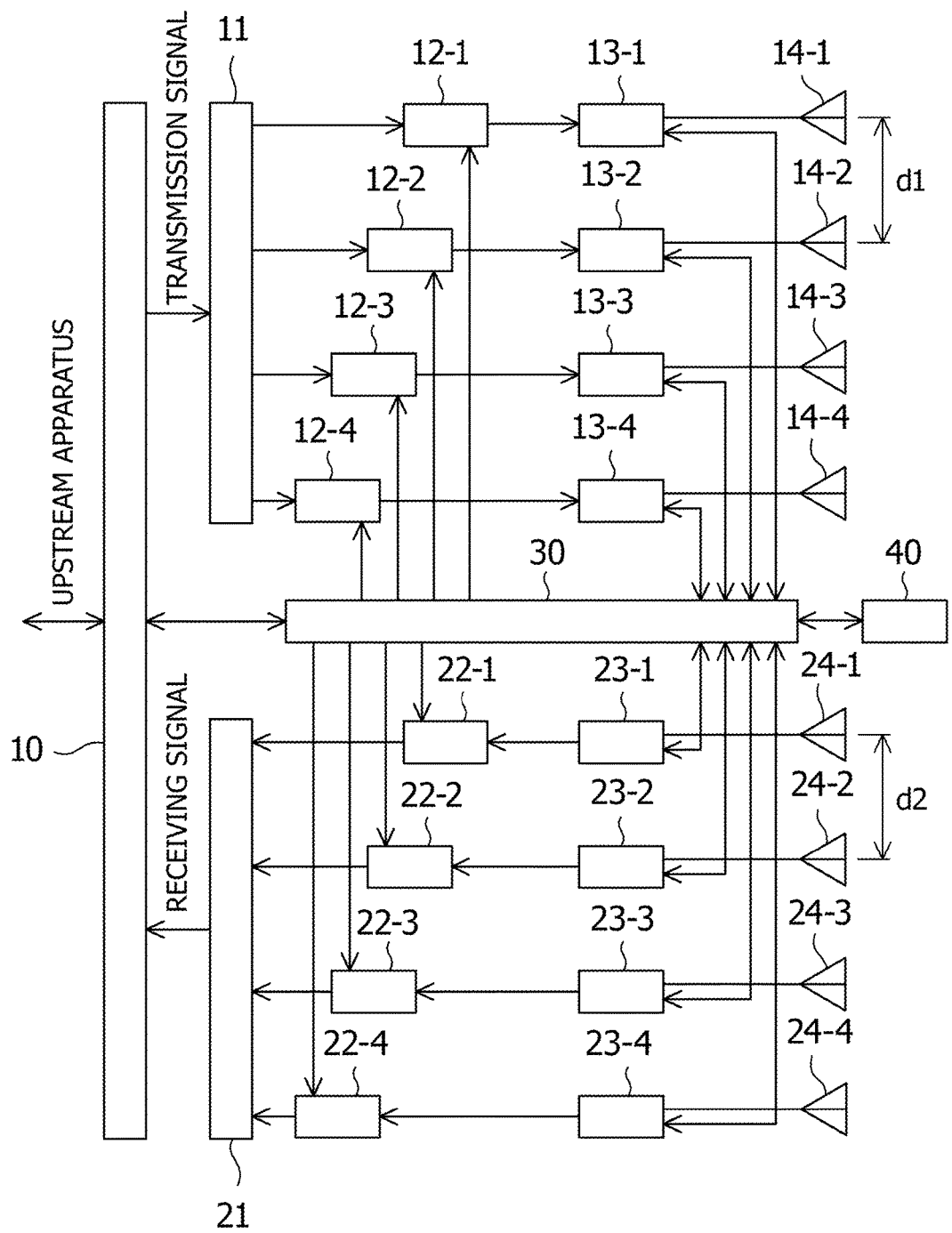
FIG. 1 is a block diagram which illustrates a first embodiment of a base station antenna apparatus according to the present invention.

FIG. 1 illustrates an embodiment of a base station antenna apparatus according to the present invention. This antenna apparatus is used for performing communication by a Frequency Division Duplex (FDD) method, and includes a radio unit 10, distribution device 11, a synthesis device 21, a control unit 30, and a storage unit 40.

The radio unit 10 is configured to perform frequency conversion, analog-digital conversion, signal processing, communication control, and the like, to output a high frequency power signal of a radio signal frequency to the distribution device 11, to input a synthesized signal described below output from the synthesis device 21, and to communicate with the control unit 30.

To the distribution device 11, n (n is an integer equal to or greater than 2: in the present embodiment, n=4) transmission paths are connected. In a first transmission path, a phase shifting device 12-1, a detection device 13-1, and a transmission antenna 14-1 are arranged, and similar components each denoted with a corresponding reference numeral are arranged in a second, a third, and a fourth transmission path, respectively.

To the synthesis device 21, m (m is an integer equal to or greater than 2: in the present embodiment, m=4) receiving paths are connected. In a first receiving path, a phase shifting device 22-1, a detection device 23-1, and a receiving antenna 24-1 are arranged, and similar components each denoted with a corresponding reference numeral are arranged in a second, a third, and a fourth receiving path, respectively.

Figure 11:
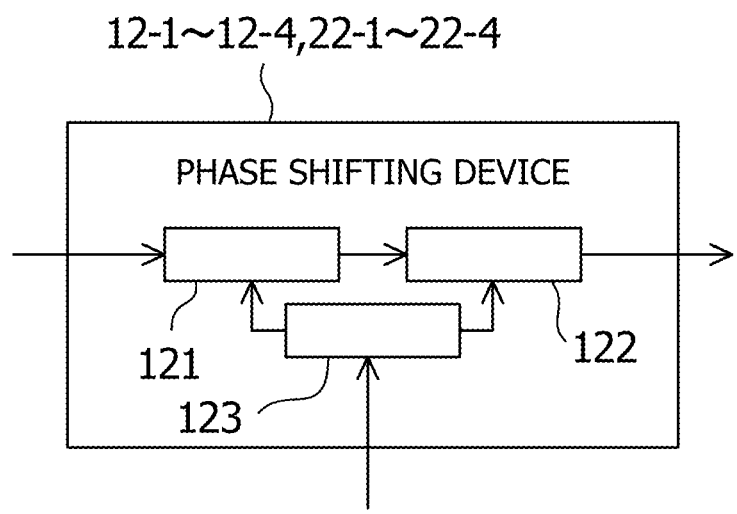
FIG. 11 is a block diagram which illustrates an example of a configuration of a phase shifting device.

The phase shifting devices 12-1 to 12-4 and 22-1 to 22-4, as illustrated in FIG. 11 as ones with an example of their configuration, include a phase adjusting device 121 configured to change the phase of an input signal, an amplitude adjusting device 122 configured to adjust the amplitude of an input signal, and a signal conversion device 123 configured to convert a digital control signal for phase adjustment and a digital control signal for amplitude adjustment that are input from the control unit 30 respectively into a corresponding direct current control signal and to output the converted direct current control signal to the phase adjustment device 121 and the amplitude adjustment device 122.

In the phase adjustment device 121, a capacity variable diode, in which the capacity is varied by the direct current control signal for adjustment of the phase, is used as a phase shift element, for example. The phase adjustment device 121 which uses this capacity variableness diode can be configured as a small device compared with a phase adjustment device constituted by microstrip lines, and thus, it does not occupy much installation space if it is arranged in each transmission path and receiving path.

The amplitude adjustment device 122 is an attenuator in which the attenuation is varied by the direct current control signal for amplitude adjustment.

Note that for transmission and receiving of signals between the control unit 30 and the signal conversion device 123, a serial interface such as RS485 is used in which bus connection, which enables connection of a plurality of devices on the same signal line, can be used. With the above-described configuration, it becomes unnecessary to increase the number of the signal lines even if the number of phase shifting devices arranged in the apparatus is increased.

Figure 12:
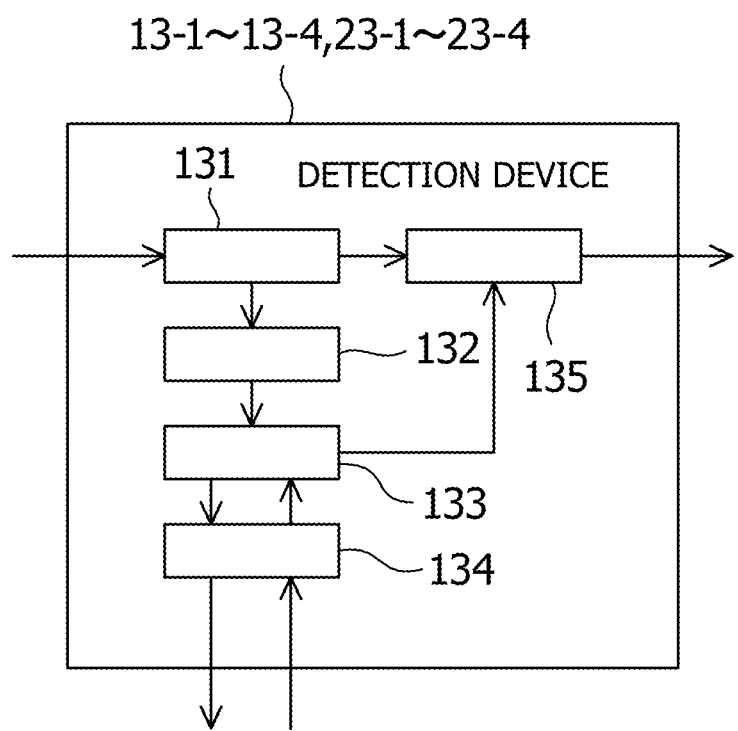
FIG. 12 is a block diagram which illustrates an example of a configuration of a detection device.

The detection devices 13-1 to 13-4 and 23-1 to 23-4, as illustrated in FIG. 12, as those with an example of their configuration, include a coupling device 131 which is coupled with a main path and configured to extract a high frequency signal that has been attenuated by a predetermined amount, a wave filtering device 132 configured to allow a signal of a specific frequency to path through, a wave detection device 133 configured to detect the signal that has passed through the wave filtering device 132 and output a switching signal to a path switching device 135 if the level of the detected signal is lower than a reference value, a signal conversion device 134 configured to convert an output signal from the wave detection device 133 into a digital signal and output the converted digital signal to the control unit 30, and a path switching device 135 having a function for disconnecting a corresponding path from the antenna by the switching signal from the wave detection device 133 and for terminating the line for the antenna, from which the corresponding path has been disconnected, to a characteristic impedance of the disconnected path (for example, 50Ω).

For transmission and receiving of signals between the control unit 30 and the signal conversion device 134, a serial interface such as RS485 is used in which bus connection, which enables connection of a plurality of devices on the same signal line, can be used. With the above-described configuration, it becomes unnecessary to increase the number of the signal lines even if the number of phase shifting devices arranged in the apparatus is increased.

Transmission antennas 14-1 to 14-4 are arranged in a vertical direction with a predetermined distance d1 between each of them, and receiving antennas 24-1 to 24-4 are also arranged in a vertical direction with a distance d2. In the present embodiment, the above-described distances d1 and d2 are set to satisfy the expression $0.5\lambda \leq d \leq 1\lambda$ ($\lambda$ is the wavelength of the center frequency of the operating frequency band); however, the distances are not limited to this.

Referring to FIG. 1, the high frequency power signal of the radio signal frequency output from the radio unit 10 to the distribution device 11 is distributed by the distribution device 11 into four signals, and the resulting signals are output to the transmission path, respectively. In this process, the amplitude value in and the amount of phase shift by the phase shifting devices 12-1 to 12-4 are set according to a control signal from the control unit 40 so that a predetermined directivity of the transmission antenna in the vertical plane can be implemented. Accordingly, the transmission antennas 14-1 to 14-4 connected to the transmission paths are excited so that the predetermined directivity in a vertical plane can be implemented.

On the other hand, the receiving antennas 24-1 to 24-4 output a reception signal corresponding to the intensity of the electric wave of the received radio signal frequency to the receiving path, respectively. In this process, the amplitude value and the amount of phase shift by the phase shifting devices 22-1 to 22-4 are set according to a control signal from the control unit 40 so that a predetermined directivity of the receiving antenna in the vertical plane can be implemented. The signal that has passed through each of the phase shifting devices 22-1 to 22-4 is synthesized by the synthesis device 21 and the synthesized signal is output to the radio unit 10 as a reception signal.

The control unit 30 includes an interface for serial communication with the radio unit 10, ports for controlling each of the phase shifting devices 12-1 to 12-4 and 22-1 to 22-4, ports for transmission and receiving of signals to and from each of the detection devices 13-1 to 13-4 and 23-1 to 23-4, and a port for transmission and receiving of a signal to and from the storage unit 40. Software for the control unit 30 can be rewritten by the radio unit 10.

The storage unit 40, which is a nonvolatile memory, includes a transmission system data table and a reception system data table in which data for setting the amplitude value and the phase shift amount in the phase shifting devices 12-1 to 12-4 and 22-1 to 22-4 have been previously stored. The data tables can be rewritten by the radio unit 10 via the control unit 30.

Now, operations will be described that are to be performed if any breakage of a coaxial cable has occurred in one path of the four transmission paths illustrated in FIG. 1, for example, in the third transmission path to which the transmission antenna 14-3 is connected, between the distribution device 11 and the detection device 13-3, for example.

In this case, the level of the output signal from the wave detection device 133 (see FIG. 12) of the detection device 13-3 for the third transmission path drops. The control unit 30 monitors the level of the signal output from the wave detection device 133 of each of the detection devices 13-1 to 13-4, and thus, based on the level of the signal output from the wave detection device 133 of the detection device 13-3 only dropping to a level lower than the reference value, the control unit 30 determines that abnormality has occurred in the third transmission path only.

On the other hand, the detection device 13-3 for the third transmission path outputs the switching signal based on the level of the signal output from the wave detection device 133 (see FIG. 12) having dropped, and controls the path switching device 135 (see FIG. 12) to perform a switching operation. By performing the above-described operation, the path in which the detection device 13-3 for the third transmission path is arranged is disconnected from the antenna, and the line in the antenna from which the path has been disconnected is terminated to the characteristic impedance of the disconnected path (for example, 50Ω). The switching by this path switching device 135 is implemented by elements installed inside the device, such as high frequency relays and PIN diodes.

The termination is performed in order to suppress reradiation from the antenna for the transmission path in which abnormality has occurred (in the example described above, the transmission antenna 14-3 connected to the third transmission path) and to suppress the adverse effect from the reradiation on the directivity to a minimum.

Incidentally, suppose that a predetermined normal directivity of transmission antenna in vertical plane is set when all of the n (=4) transmission paths described above are in a normal state, and if abnormality occurs in i (1≤i<n) transmission path(s) among the transmission paths, deformation of directivity in vertical plane according to the location of arrangement of the transmission antenna for the i paths in which the abnormality has occurred will be caused. The deformed directivity in a vertical plane can be corrected by controlling the amplitude value and the phase shift amount in the phase shifting device for the normal transmission path(s), i.e., the deformed directivity in a vertical plane can thereby be approximated to the normal directivity in a vertical plane before deformation of the directivity.

Similarly, suppose that a predetermined normal directivity of receiving antenna in a vertical plane is set when all of the m (=4) receiving paths are in a normal state, if abnormality occurs in k (1≤k<m) receiving path(s) among the receiving paths, deformation of directivity in a vertical plane according to the number k of abnormal paths will be caused. The deformed directivity in a vertical plane can be corrected by controlling the amplitude value and the phase shift amount in the phase shifting device for the normal receiving path(s), i.e., the deformed directivity in vertical plane can thereby be approximated to the normal directivity in a vertical plane before deformation of the directivity.

In the transmission system data table of the storage unit 40, previously stored are directivity instruction data for setting the amplitude value and the phase shift amount for the transmission system phase shifting devices 12-1 to 12-4 for obtaining a predetermined normal directivity of transmission antenna in a vertical plane, and also previously stored therein are directivity instruction data for setting the amplitude value and the phase shift amount for the phase shifting device(s) in the other (n−i) normal transmission path(s), which are necessary for correcting the deformation of the directivity in a vertical plane caused if abnormality has occurred in i paths.

Similarly, in the receiving system data table of the storage unit 40, previously stored are directivity instruction data for setting the amplitude value and the phase shift amount for the receiving system phase shifting devices 22-1 to 22-4 for obtaining a predetermined normal directivity of receiving antenna in a vertical plane, and also previously stored therein are directivity instruction data for setting the amplitude value and the phase shift amount for the phase shifting device(s) in the other (m−k) normal transmission path(s), which are necessary for correcting the deformation of the directivity in a vertical plane caused if abnormality has occurred in k paths.

The directivity instruction data stored in the above-described data tables can be obtained by previously performing experiments and simulations.

Next, a configuration of the data table will be specifically described.

If abnormality has occurred in one path of the four transmission paths or if abnormality has occurred in one path of the four receiving paths, a data table having a configuration described below as "First Example" is applied, and if abnormality has occurred in two paths of the four transmission paths or if abnormality has occurred in two paths of the four receiving paths, then a data table having a configuration described below as "Second Example" is applied. Note that in each data table, the stored directivity instruction data are indicated with a circle ("o")

First Example

TABLE 1

|  |  | Path to be set | | | |
|---|---|---|---|---|---|
|  |  | 1 | 2 | 3 | 4 |
| Abnormal path | 1 | \ | o | o | o |
|  | 2 | o | \ | o | o |
|  | 3 | o | o | \ | o |
|  | 4 | o | o | o | \ |

According to this data table, if the abnormal path is the first path, directivity instruction data for the second to the fourth paths are set.

Second Example

TABLE 2

|  |  | Path to be set | | | |
|---|---|---|---|---|---|
|  |  | 1 | 2 | 3 | 4 |
| Abnormal path | 1, 2 | — | — | o | o |
|  | 1, 3 | — | o | — | o |
|  | 1, 4 | — | o | o | — |
|  | 2, 3 | o | — | — | o |
|  | 2, 4 | o | — | o | — |
|  | 3, 4 | o | o | — | — |

According to this data table, if the abnormal paths are the first and the second paths, directivity instruction data for the third and the fourth paths are set.

If all of the n transmission paths are normal, the control unit 30 reads the corresponding directivity instruction data from the transmission system data table and controls the amplitude value and the phase shift amount for the transmission phase shifting devices 12-1 to 12-4 so that the predetermined normal directivity of the transmission antenna in a vertical plane can be implemented by using the directivity instruction data.

On the other hand, for example, if it is determined that the third transmission path only is abnormal, the control unit 30 reads directivity instruction data for correspondence to the abnormality from the transmission system data table and controls the amplitude value and the phase shift amount for the transmission phase shifting devices 12-1, 12-2, and 12-4 so that the deformation of the directivity of transmission antenna in a vertical plane that has been caused due to the abnormality in the third transmission path is corrected by using the directivity instruction data.

If all of the n transmission paths are in their normal state as a result of the above-described process, the predetermined normal directivity of the transmission antenna in a vertical plane is implemented. If abnormality has occurred in i transmission paths, the directivity in a vertical plane approximated to the normal directivity in a vertical plane is implemented.

The control unit 30 also performs a process according to the process described above for the receiving system, and thus, if all of the m receiving paths are normal, the predetermined normal directivity of receiving antenna in a vertical plane is implemented, and if abnormality has occurred in k paths, the directivity in a vertical plane approximated to the normal directivity in a vertical plane is implemented.

Figure 2A:
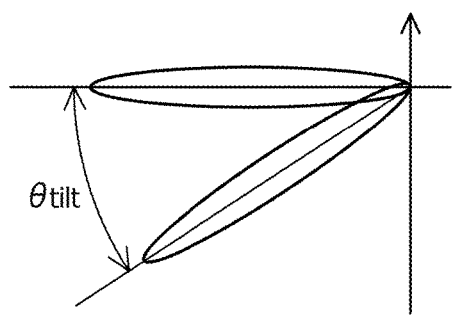
FIG. 2(a) is a graph which illustrates variation in directivity in a vertical plane if abnormality has been detected.

Next, variation of directivity in a vertical plane that may occur if abnormality is detected will be described with reference to FIGS. 2(a)-2(e). The tilt angle for the electric wave is denoted as $\theta_{tilt}$ with its reference in the horizontal direction as illustrated in FIG. 2(a). In this example, the tilt angle $\theta_{tilt}$ for a case in which all paths are normal is $\theta_0$ illustrated in FIG. 2(b).

Figure 2D:
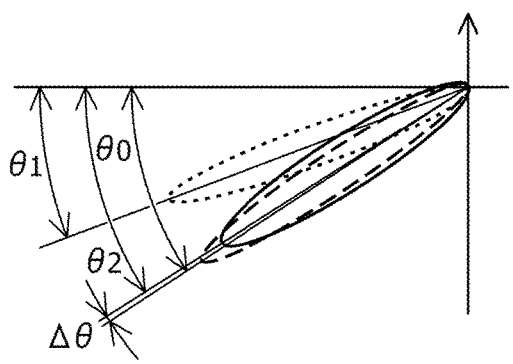
FIG. 2(d) is a graph which illustrates variation in directivity in a vertical plane if abnormality has been detected.
Figure 2B:
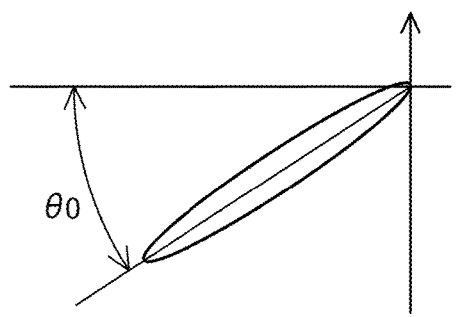
FIG. 2(b) is a graph which illustrates variation in directivity in a vertical plane if abnormality has been detected.
Figure 2E:
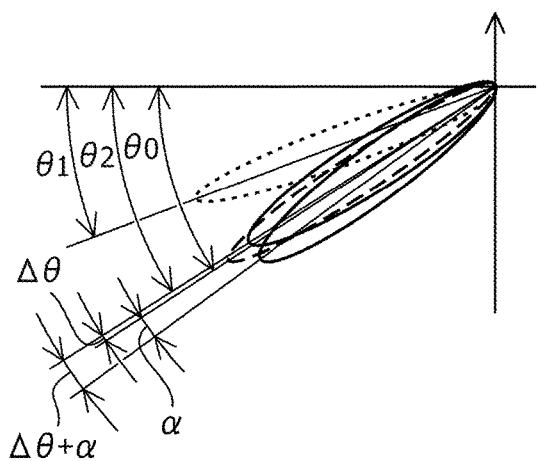
FIG. 2(e) is a graph which illustrates variation in directivity in a vertical plane if abnormality has been detected.
Figure 2C:
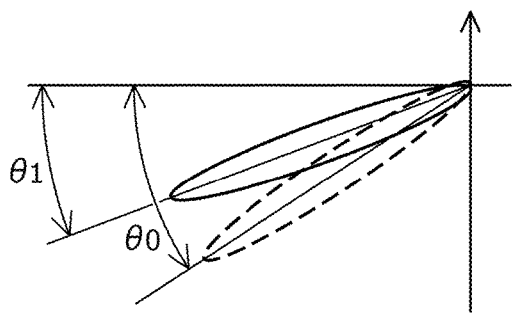
FIG. 2(c) is a graph which illustrates variation in directivity in a vertical plane if abnormality has been detected.

Suppose that the third transmission path is abnormal as in the case described above, the tilt angle $\theta_{tilt}$ changes from $\theta_0$ to $\theta_1$ as illustrated in FIG. 2(c). Then, the control unit 30, which has now detected the abnormality in the third transmission path, performs the above-described process in which the directivity instruction data in the data table stored in the storage unit 40 is referred to, and as a result of this process, the tilt angle is autonomously corrected to $\theta_2$, which is approximated to $\theta_0$, as illustrated in FIG. 2(d).

In summary, the directivity instruction data in the above-described data table include values set to minimize the difference $\Delta\theta$ between $\theta_0$ and $\theta_2$.

Incidentally, if any abnormality occurs in any of the transmission paths, the transmission antenna concerned with the abnormal transmission path is disconnected, and thus, the number of operating transmission antennas is reduced. As a result, the half value width of the directivity in vertical plane tends to increase as the number of the operating transmission antennas decreases, i.e., the service area tends to become larger than the designed service area.

To correspond to this, the values of the directivity instruction data in the above-described data table may be set so as to prevent variation of the service area that may occur if abnormality has occurred in the transmission path. More specifically, the service area may become smaller as the tilt angle of the electric wave increases, and therefore, the value of the directivity instruction data in the data table may be set so that the tilt angle of the electric wave illustrated in FIG. 2(e) as an example would be set, i.e., so that a tilt angle greater than the tilt angle of the electric wave illustrated in FIG. 2(d) by an angle $\alpha$ would be set. The above-described adjustment angle $\alpha$ is also determined by performing experiments and simulations.

Note that the directivity instruction data in the data table is set in consideration not only of the antenna orientation but also of other antenna characteristics (e.g., the side lobe level).

Figure 3:
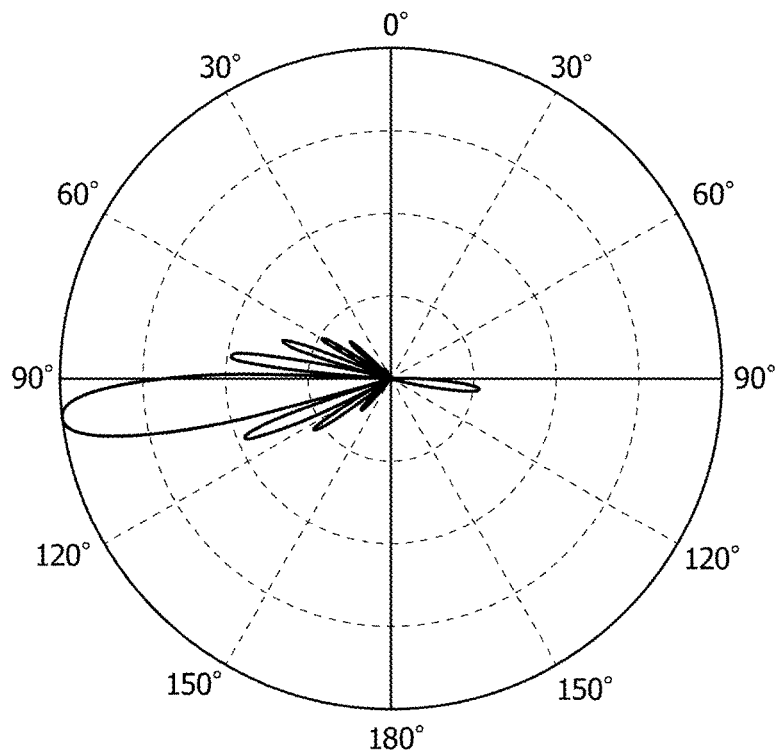
FIG. 3 is a graph which illustrates a directivity of a transmission antenna in a vertical plane if all the transmission paths are in their normal state.
Figure 4:
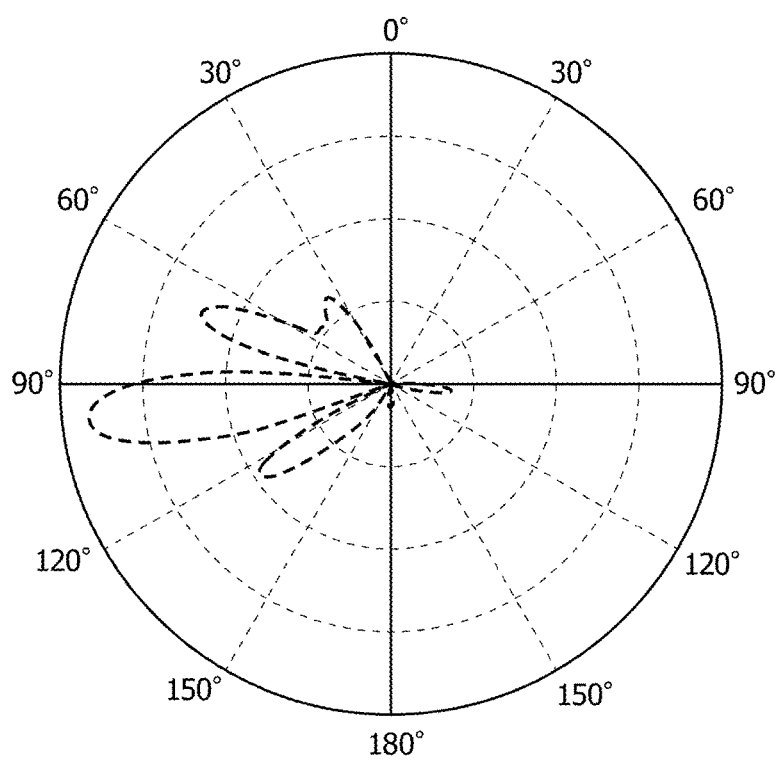
FIG. 4 is a graph which illustrates a directivity of a transmission antenna in a vertical plane if abnormality has occurred in a specific transmission path.
Figure 5:
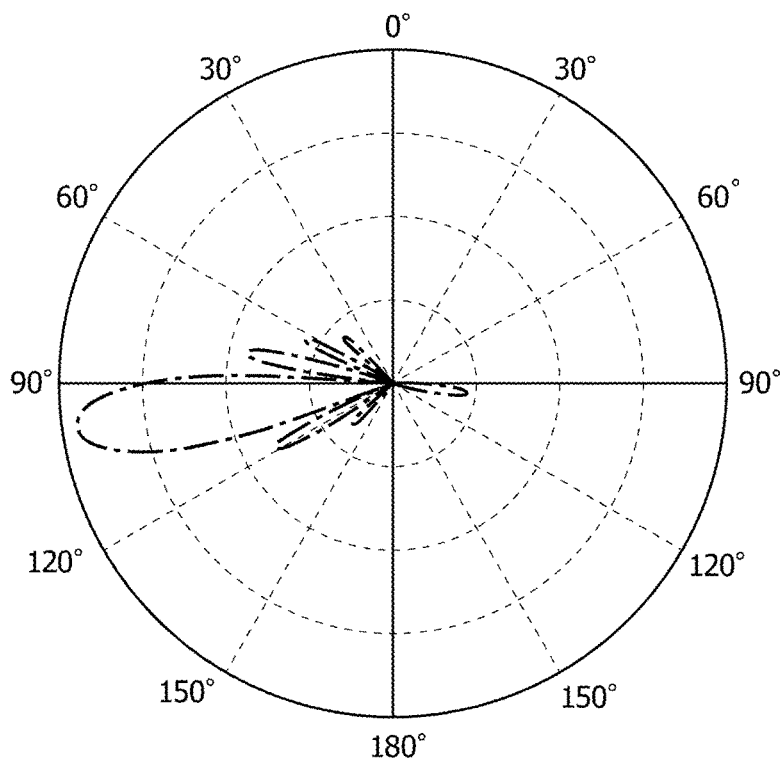
FIG. 5 is a graph which illustrates a corrected directivity of the transmission antenna in the vertical plane.
Figure 6:
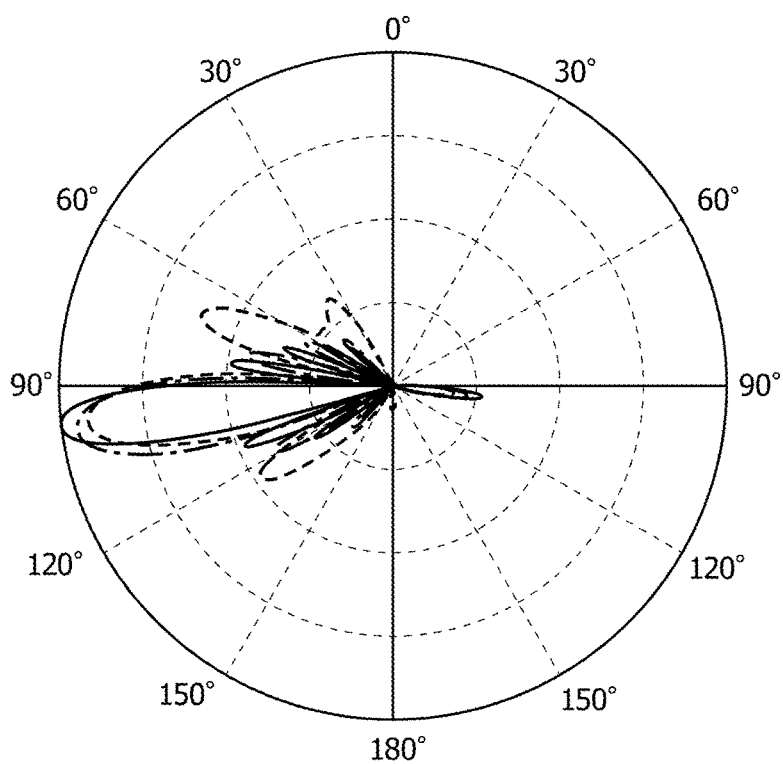
FIG. 6 is a graph which illustrates a state in which the directivities illustrated in FIGS. 3 to 5 are superposed.

FIG. 3 is a graph which illustrates the directivity of a transmission antenna in a vertical plane obtained if all of the n transmission paths are normal, FIG. 4 is a graph which illustrates the directivity obtained if abnormality has occurred in the transmission path, FIG. 5 is a graph which illustrates the directivity corrected by using the directivity instruction data in the transmission system data table, and FIG. 6 is a graph which illustrates a state in which the directivities illustrated in FIGS. 3 to 5 are superposed. Note that the corrected directivity illustrated in FIG. 5 is obtained as a result of correction performed by using directivity instruction data set in consideration of the adjustment angle $\alpha$ illustrated in FIG. 2(d).

As is apparent from FIG. 6, according to the present invention, if abnormality has occurred in the transmission path, directivity in a vertical plane approximated to a normal directivity in vertical plane is implemented, and also variation in the service area can be prevented due to an increased beam tilt angle by using the directivity instruction data obtained in consideration of the adjustment angle $\alpha$ described above.

After the directivity correction processing described above is performed, and thus the path in which abnormality has occurred returns to its normal state, then the path switching device 135 (see FIG. 12) of the detection device for the abnormal path performs a reset operation, and as a result, the antenna corresponding to the line is connected. In addition, the control unit 40 determines that all of the paths are normal and performs control of the directivity so that the predetermined normal directivity in a vertical plane is implemented.

As described above, according to the base station antenna apparatus of the present embodiment, if abnormality has occurred in a specific transmission path and/or receiving path, the directivity in a vertical plane is corrected so that it is approximated to the directivity in a vertical plane imparted in normal states, and thus, variation of the communication area can be reduced to a minimum. In addition, the phase and the amplitude of a signal of radio signal frequency are changed, and thus, no circuit for demodulation to the base band becomes necessary, and further, data in the data table stored on a nonvolatile memory is used for correction and control of the directivity, no complex calculation processing becomes necessary, and thus, it becomes possible to configure the system by using an inexpensive microprocessor (MPU) as processing means.

Note that in the present embodiment, the locations of the phase shifting devices 22-1 to 22-4 and the locations of the wave detection devices 23-1 to 23-4 can be interchanged.

Incidentally, in some mobile communication systems, several tens of watts of transmission power is input to the antenna, and in a case such as this, devices with a high electric power resistance are necessary as the phase shifting devices 12-1 to 12-4 if the configuration illustrated in FIG. 1 is employed as it is. However, phase shifting devices with a high electric power resistance are large in size.

Figure 7:
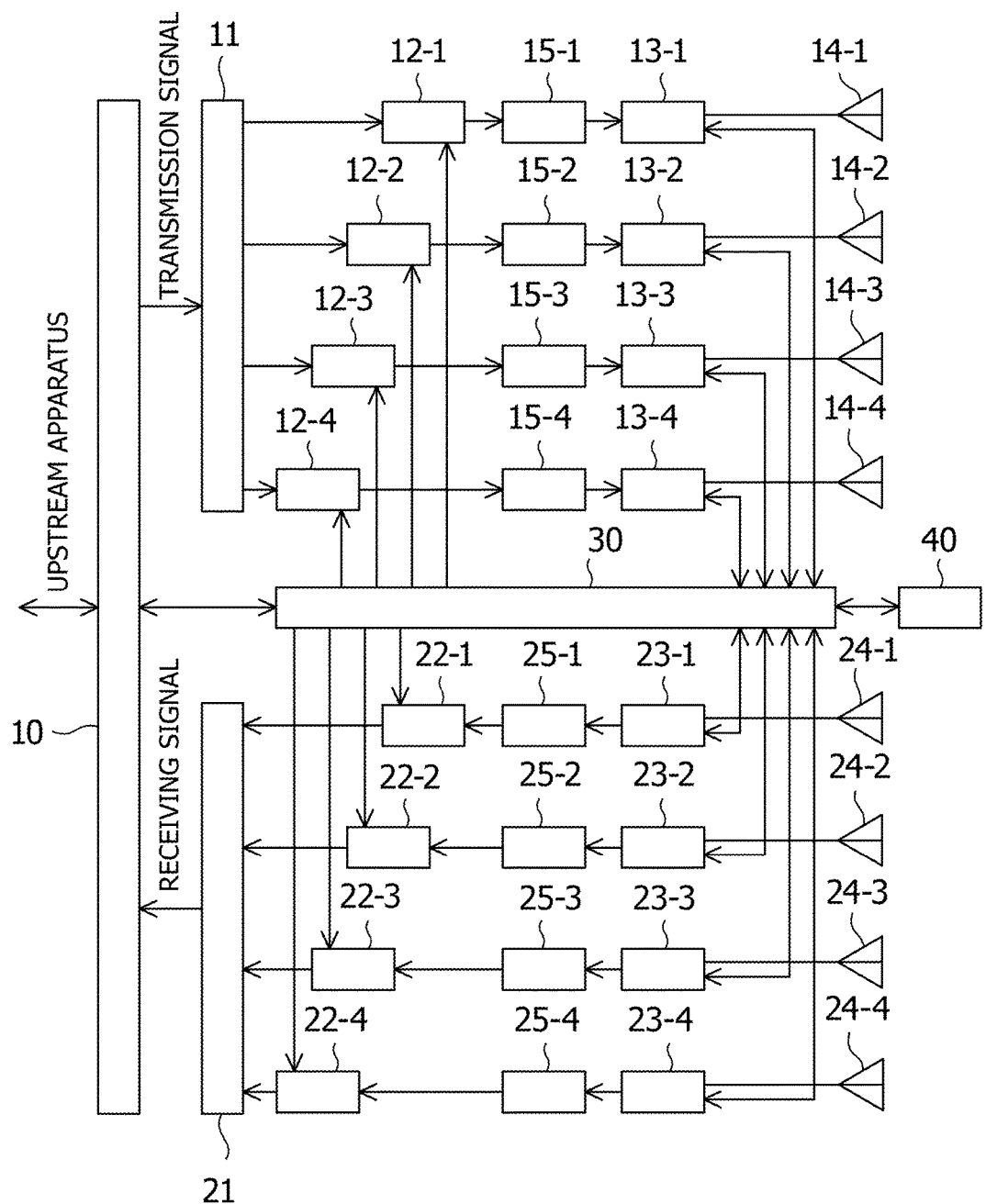
FIG. 7 is a block diagram which illustrates a second embodiment of a base station antenna apparatus according to the present invention.

FIG. 7 illustrates a second embodiment of the present invention that is capable of preventing the use of phase shifting devices with a high electric power resistance. This embodiment includes a configuration in which amplification devices 15-1 to 15-4 are arranged, respectively, at stages subsequent to the transmission system phase shifting devices 12-1 to 12-4. With this configuration, small amounts of power can be used as the power to be input to the phase shifting devices 12-1 to 12-4, and thus, it becomes possible to use small devices with a low electric power resistance (for example, phase shifting devices that use capacity variable diodes) as the phase shifting devices 12-1 to 12-4.

Of course, as illustrated in the drawing, amplification devices 25-1 to 25-4 can be arranged, respectively, at stages preceding the receiving system phase shifting devices 22-1 to 22-4. In this configuration, the locations of the amplification devices 25-1 to 25-4 and the locations of the wave detection devices 23-1 to 23-4 can be interchanged.

Elements such as amplification devices usually have individual difference in the phase characteristics and amplitude characteristics. However, the antenna apparatus according to the present invention has a structure in which the phase shifting device is arranged in each path, and thus, even if elements such as amplification devices are added as described above, it is made possible to correct the phase characteristics and the amplitude characteristics for each path. More specifically, the phase and the amplitude can be corrected only by previously measuring the phase characteristics and the amplitude characteristic of a single element such as the above-described amplification device or the phase characteristics and the amplitude characteristics for each entire path after the elements have been installed to each path and by correcting the data in the data table stored in the storage unit 40 based on the obtained measurement data. Accordingly, even if elements such as amplification devices are added as described above, change of hardware by adding a correction element, circuits, and the like is unnecessary. Note that the correction of data in the data table can be performed by the radio unit 10 via the control unit.

Figure 8:
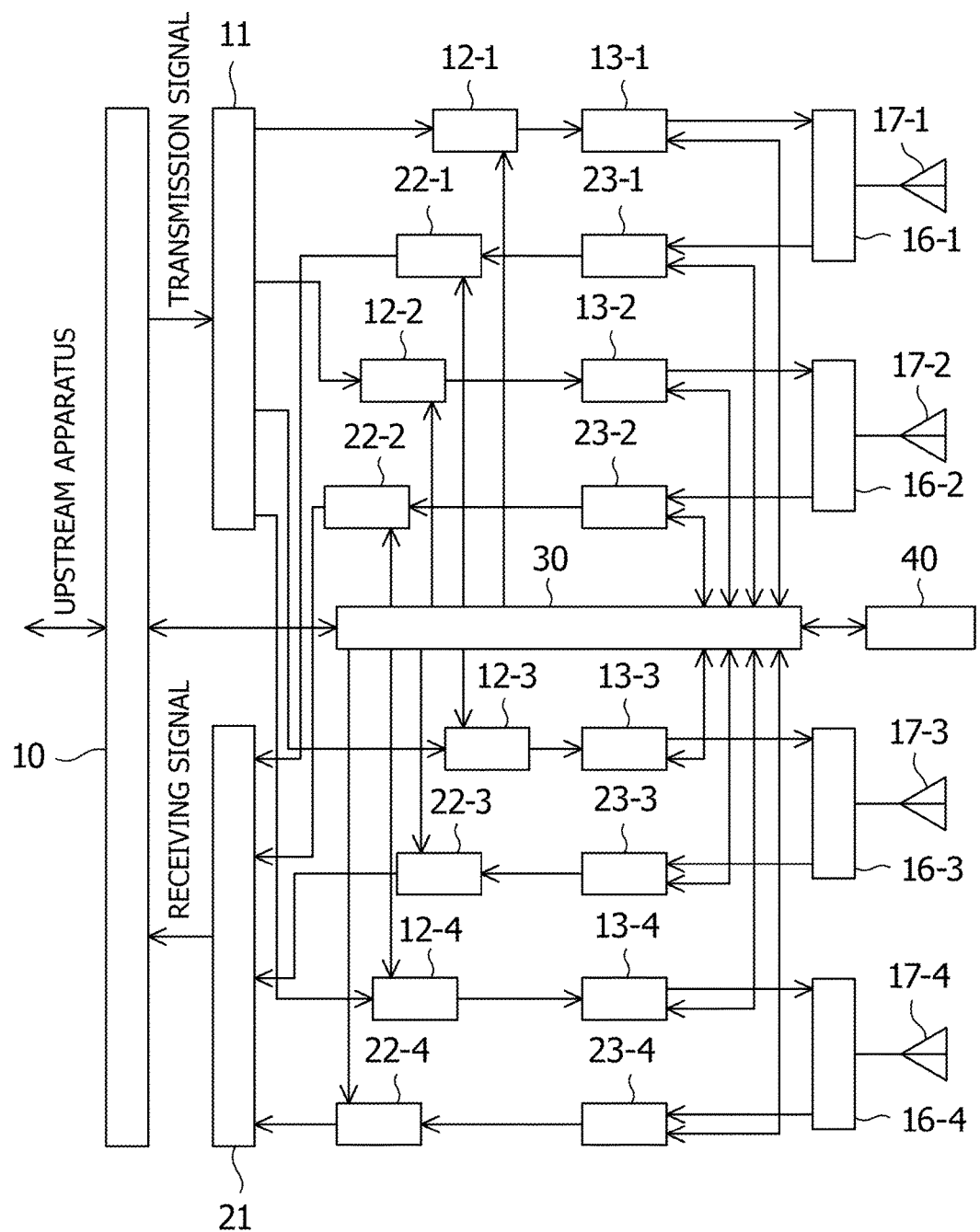
FIG. 8 is a block diagram which illustrates a third embodiment of a base station antenna apparatus according to the present invention.

FIG. 8 illustrates a third embodiment of the present invention, which uses transmission and reception shared antennas (transceiver) 17-1 to 17-4 that are used in a shared manner for radio signal frequency for transmission and radio signal frequency for reception instead of the transmission antennas 14-1 to 14-4 and the receiving antennas 24-1 to 24-4 of the first embodiment described above. In the present embodiment, the antennas 17-1 to 17-4 are connected to the corresponding transmission paths and the receiving paths, respectively, via distribution and synthesis devices 16-1 to 16-4.

Figure 9:
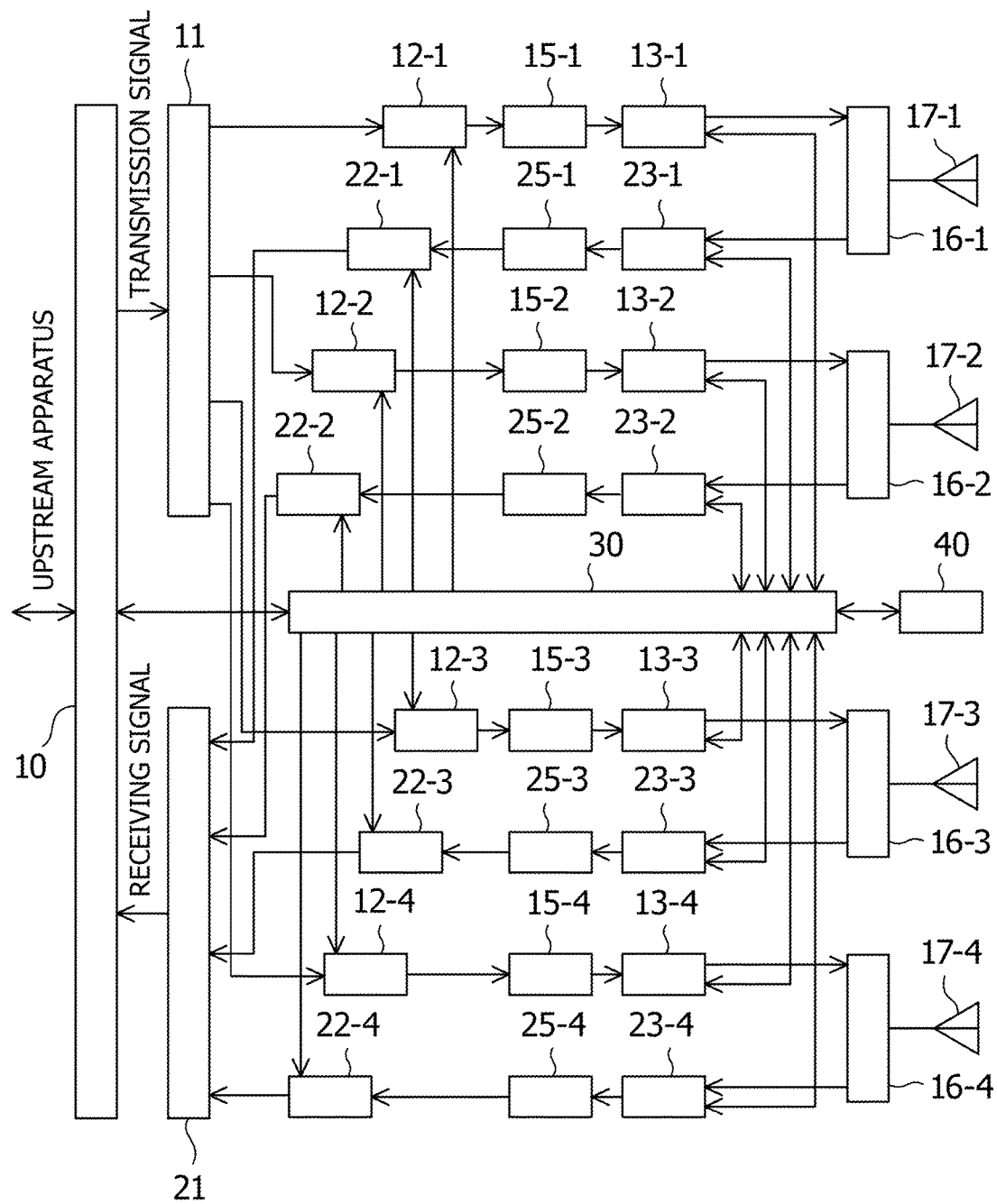
FIG. 9 is a block diagram which illustrates a fourth embodiment of a base station antenna apparatus according to the present invention.

A fourth embodiment illustrated in FIG. 9 has a configuration in which the amplification devices 15-1 to 15-4 illustrated in FIG. 7 are arranged in addition to the third embodiment described above.

Figure 10:
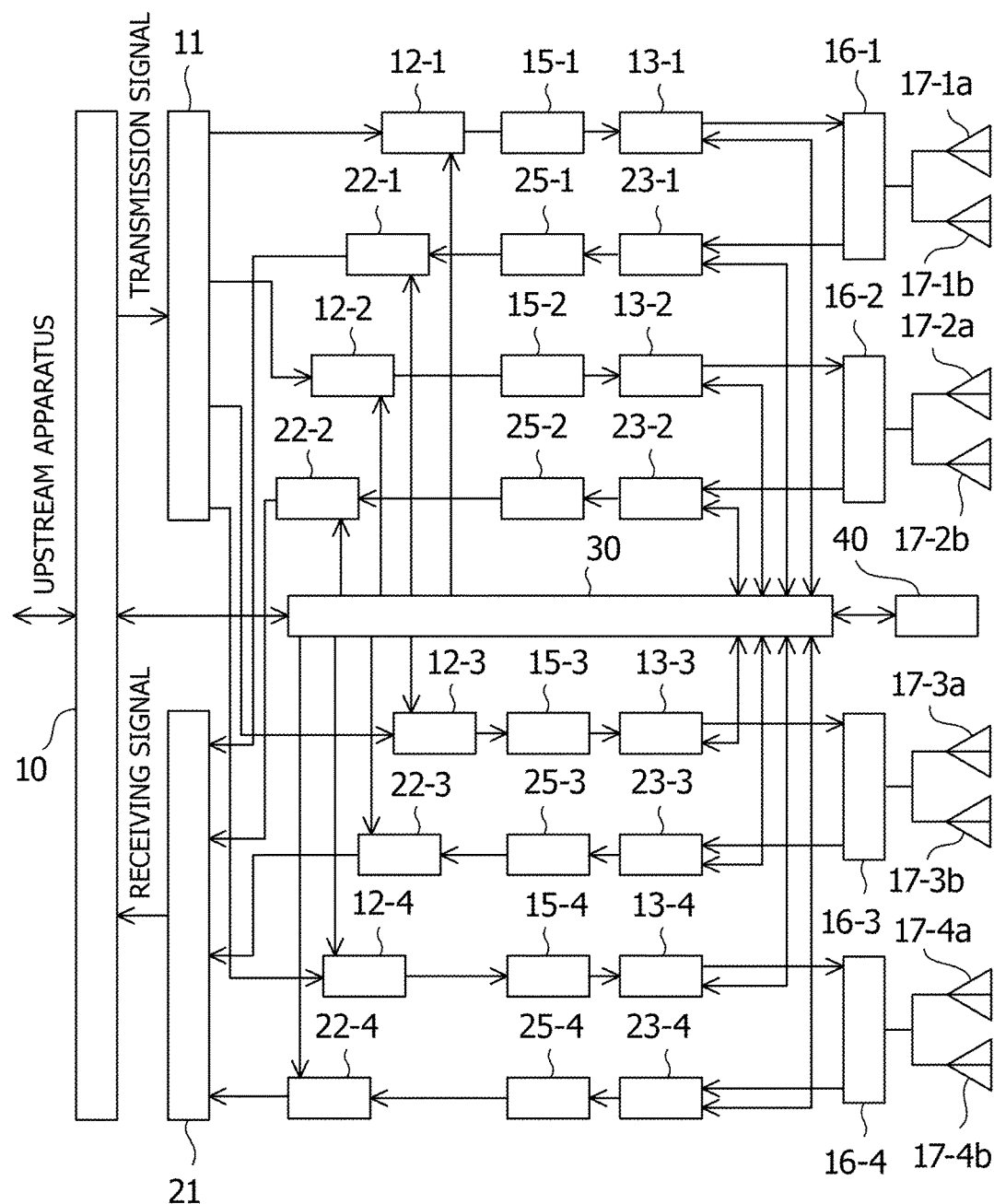
FIG. 10 is a block diagram which illustrates a fifth embodiment of a base station antenna apparatus according to the present invention.

In addition, a fifth embodiment illustrated in FIG. 10 has a configuration in which the transmission and reception shared antennas 17-1 to 17-4 of the fourth embodiment described above are respectively arranged as arrays. In the present embodiment, the antennas are arranged as an array by using two transmission and reception shared antennas denoted with the reference symbols "a" and "b", but an array can also be constituted by three or more transmission and reception shared antennas.

Note that the antennas 14-1 to 14-4 and the antennas 24-1 to 24-4 illustrated in FIGS. 1 and 7 also can be configured as an array, respectively.

The present invention is not limited to the above-described embodiments and can include various modifications such as embodiments described below as examples.

[1] In the detection device illustrated in FIG. 12, the level of the signal detected by using the wave detection device 133 is compared with the reference value, and the reference value can be altered and adjusted according to the control signal from the control unit 30 as necessary. It is necessary to set the above-described reference value so that abnormality in a line in which the detection device is arranged can be appropriately detected.

[2] The radio unit 10 of each embodiment can include a function for individually setting the phase and the amplitude of the respective phase shifting devices by transmitting a control signal to the control unit 30. For example, it is possible to set as the tilt angle $\theta_{tilt}$ illustrated in FIG. 2(*a*). In addition, in this modification, if any abnormal path is detected, the phase and the amplitude of the phase shifting devices are controlled so that the directivity in a vertical plane thereof are approximated to the directivity in a vertical plane imparted in states in which no abnormal path exists as described above.

[3] An embodiment in which the radio unit 10 includes the control unit 30 and the storage unit 40 can be employed. In this case, the radio unit 10 performs the transmission and receiving of signals with the detection devices 13-1 to 13-4 and 23-1 to 23-4 and the control of the phase shifting devices 12-1 to 12-4 and 22-1 to 22-4. In addition, the radio unit 10 is capable of performing communication with upstream apparatuses (e.g., a base station apparatus that performs base band signals processing).

[4] In the embodiments described above, an abnormality determination reference value is set commonly to the four transmission paths and an abnormality determination reference value is set commonly to the four receiving paths. However, of course it is also possible to set an individual abnormality determination reference value differently for the four transmission paths and the four receiving paths.

[5] As described above, the control unit 30 monitors the level of signals output from the wave detection device 133 (see FIG. 12) of the detection devices 13-1 to 13-4 and the detection devices 23-1 to 23-4, and if the level of the output signal has become lower than the reference value, then the control unit 30 determines that abnormality has occurred in the corresponding path and performs correction of the directivity.

However, because the degree of influence on the directivity in a vertical plane differs between a case of a serious abnormality in which the degree of drop of the output signal level described above is high and a case of a slight abnormality in which the degree of drop of the output signal level is low, it is preferable to perform correction of the directivity according to the degree of abnormality in performing correction of the directivity in a vertical plane at a higher accuracy.

To satisfy the above-described demand, a configuration may be employed in which a plurality of reference values, e.g., three reference values Ta, Tb, Tc (Ta>Tb>Tc), are set as abnormality determination reference values commonly set for the four transmission paths, a plurality of reference values, e.g., three reference values Ra, Rb, Rc (Ra>Rb>Rc), are similarly set as abnormality determination reference values commonly set for the four receiving paths, and further, the data table having the configuration described above as the "First Example" is respectively set in correspondence with each of the reference values Ta, Tb, and Tc, and the reference values Ra, Rb, and Rc.

In this configuration, suppose that the level of the output signal from the wave detection device 133 for the first transmission path is $V_{T1}$, the control unit 30 performs determination as to whether the level $V_{R1}$ satisfies any of abnormality determination conditions Ta≥$V_{T1}$>Tb, Tb≥$V_{T1}$>Tc, and Tc≥$V_{T1}$, for example. If it is determined that the level $V_{T1}$ satisfies the abnormality determination condition Ta≥$V_{T1}$>Tb, then the control unit 30 performs the correction of the directivity by applying the directivity instruction data in the transmission system data table set in correspondence with the reference value Ta. Note that similar processes are performed in the cases of abnormality in a receiving system path.

More specifically, the three transmission system data table provided in correspondence with the reference values Ta, Tb, Tc are applied if the level $V_T$ of the output signal from the wave detection device 133 in the transmission system path satisfies conditions Ta≥$V_T$>Tb, Tb≥$V_T$>Tc, and Tc≥$V_T$, respectively. Similarly, the three receiving system data tables provided in correspondence with the reference values Ra, Rb, Rc are applied if the level $V_R$ of the output signal from the wave detection device 133 in the receiving system path satisfies conditions Ra≥$V_R$>Rb, Rb≥$V_R$>Rc, and Tc≥$V_R$, respectively.

[6] The present invention can also be applied to communication by a Time Division Duplex (TDD) method.

REFERENCE SIGNS LIST

10 Radio unit
11 Distribution device
12-1 to 12-4 Phase shifting device
13-1 to 13-4 Detection device
14-1 to 14-4 Transmission antenna
15-1 to 15-4 Amplification device
16-1 to 16-4 Distribution and synthesis device
17-1 to 17-4 Transmission and reception antenna
21 Synthesis device
22-1 to 22-4 Phase shifting device
23-1 to 23-4 Detection device
24-1 to 24-4 Receiving antenna
25-1 to 25-4 Amplification device
30 Control unit
40 Storage unit
121 Phase adjustment device
122 Amplitude adjustment device
123 Signal conversion device
131 Coupling device
132 Wave filtering device
133 Wave detection device
134 Signal conversion device
135 Path switching device

The invention claimed is:

1. A base station antenna apparatus for a mobile communication system, the apparatus being configured to feed a high frequency power signal of a radio signal frequency to transmission antennas connected respectively to two or more transmission paths via the transmission paths and to synthesize reception signals received by receiving antennas respectively connected to two or more receiving paths via the receiving paths, in which both the transmission antennas and the receiving antennas are respectively arranged in a vertical direction at a predetermined distance, the apparatus comprising:
  transmission system detection means configured to individually detect abnormality occurring in each of the transmission paths;
  receiving system detection means configured to individually detect abnormality occurring in each of the receiving paths; and
  control means for, when an abnormal transmission path is detected by the transmission system detection means, disconnecting the abnormal transmission path from the corresponding transmission antenna and correcting deformation of directivity of the transmission antenna in a vertical plane caused due to abnormality in the transmission path by changing and setting a phase and an amplitude of a transmission signal in a normal transmission path, and for, when an abnormal receiving path is detected by the receiving system detection means, disconnecting the abnormal receiving path from the corresponding receiving antenna and correcting deformation of directivity of the receiving antenna in a vertical plane caused due to abnormality in the receiving path by changing and setting a phase and an amplitude of a reception signal in a normal receiving path,
  wherein the correction of directivity of the transmission antenna in a vertical plane and the correction of directivity of the receiving antenna in a vertical plane by the control means are performed such that a tilt angle greater than a tilt angle of the electric wave imparted in normal states by an adjustment angle α is set, and
  wherein a magnitude of the adjustment angle α prevents variation of a service area resulting from increment of the half value width of directivity in a vertical plane which is due to reduction of number of operating transmission antennas from abnormality in a transmission path and to reduction of number of operating receiving antennas from abnormality in a receiving path.

2. The base station antenna apparatus for a mobile communication system according to claim 1, wherein the control means is configured to perform setting for changing the phase and the amplitude of the transmission signal in a normal transmission path and setting for changing the phase and the amplitude of the reception signal in a normal receiving path, based on data in a data table previously stored in a storage means.

3. The base station antenna apparatus for a mobile communication system according to claim 1, wherein the transmission system detection means for individually detecting abnormality occurring in each of the transmission paths is configured to compare a level of the transmission signal passing through each of the transmission paths with a reference value, and the receiving system detection means for individually detecting abnormality occurring in each of the receiving paths is configured to compare a level of the reception signal passing through each of the receiving paths with a reference value.

4. The base station antenna apparatus for a mobile communication system according to claim 1,
  wherein the control means includes:
    transmission system phase and amplitude setting means separately provided for each of the transmission paths, which is configured to set both the phase and the amplitude of the transmission signal passing through each of the transmission paths; and
    receiving system phase and amplitude setting means separately provided for each of the receiving paths, which is configured to set both the phase and the amplitude of the receiving signal passing through each of the receiving paths,
  wherein the phase and the amplitude of the transmission signal in the normal transmission path are changed and set by using the transmission system phase and amplitude setting means provided for the normal transmission path of the transmission paths, and the phase and the amplitude of the receiving signal in the normal receiving path are changed and set by using the receiving system phase and amplitude setting means provided for the normal receiving path of the receiving paths.

5. The base station antenna apparatus for a mobile communication system according to claim 4, wherein an amplification device is arranged for each of, and at a stage subsequent to, the separately provided transmission system phase and amplitude setting means.

6. The base station antenna apparatus for a mobile communication system according to claim 4, wherein an amplification device is arranged for each of, and at a stage preceding, the separately provided receiving system phase and amplitude setting means.

7. The base station antenna apparatus for a mobile communication system according to claim 1, wherein a transmission and reception shared antenna used in a shared manner for a radio signal frequency for transmission and a radio signal frequency for receiving is used as each of the transmission antennas and each of the receiving antennas, and the transmission and reception shared antenna is connected to the corresponding transmission path and the corresponding receiving path via a distribution and synthesis device.

8. The base station antenna apparatus for a mobile communication system according to claim 7, wherein the apparatus includes a plurality of transmission and reception shared antennas connected via the distribution and synthesis device.

9. The base station antenna apparatus for a mobile communication system according to claim 1, the apparatus further comprising:
   means for, when said abnormal transmission path is detected, disconnecting the transmission antenna connected to the abnormal transmission path from the transmission path and terminating the path to a characteristic impedance of the path; and
   means for, when said abnormal receiving path is detected, disconnecting the receiving antenna connected to the abnormal receiving path from the receiving path and terminating the path to a characteristic impedance of the path.

10. The base station antenna apparatus for a mobile communication system according to claim 1, wherein both the distance of arrangement of the transmission antennas and the distance of arrangement of the receiving antennas are set to satisfy the following condition:

$$0.5\lambda \leq d \leq 1\lambda$$

where $\lambda$ is a wavelength of a center frequency of an operating frequency band.

11. The base station antenna apparatus for a mobile communication system according to claim 1, wherein the control means is configured, when the transmission path in which abnormality has occurred has returned to a normal state, to perform processing for restoring a directivity of the transmission antenna in a vertical plane to a normal directivity, and when the receiving path in which abnormality has occurred has returned to a normal state, to perform processing for restoring a directivity of the receiving antenna in a vertical plane to a normal directivity.

* * * * *